Patented July 28, 1931

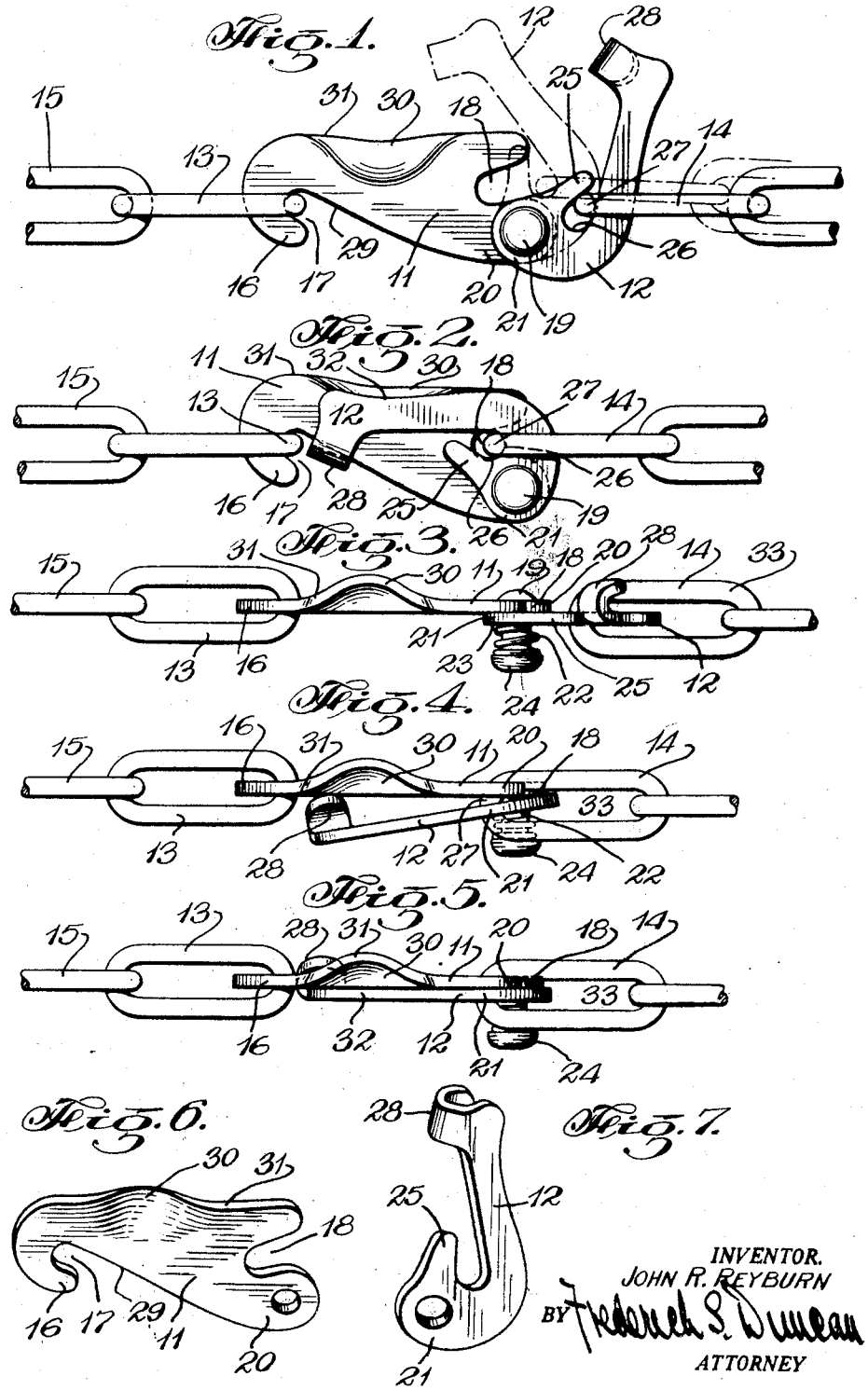

1,816,230

UNITED STATES PATENT OFFICE

JOHN R. REYBURN, OF FAIRFIELD, CONNECTICUT, ASSIGNOR TO AMERICAN CHAIN COMPANY, INC., A CORPORATION OF NEW YORK

CONNECTING DEVICE FOR CHAINS

Application filed September 21, 1929. Serial No. 394,266.

This invention relates to connecting devices for chain and is of particular utility when used for connecting and tightening the side chains of anti-skid devices for the tires of vehicle wheels, although the various features of the invention may be utilized in any field for which they are adapted by their nature.

An important object of the invention is to provide a connecting device for the above purpose especially adapted for use in connection with side chains having relatively narrow links, a form of chain which is now preferred for use with certain types of anti-skid chains.

A well-known type of connecting hook for connecting the ends of a side chain is that forming the subject of United States Letters Patent No. 1,403,319, dated January 24, 1922, and comprises two pivotally connected members, one of which is connected permanently to one end of the chain, and also has a hook upon which can be placed a selected link at the other end of the chain, and the other member is adapted to be first passed through said selected link and then swung about the pivotal connection so that it moves into a position adapted to lock the members together and hold the last mentioned link in place upon the hook, the locking action being such as not only to prevent accidental displacement of the link from the hook, but also to prevent any swinging movement of the members around their pivot until the members have been unlocked manually by the user.

In such connecting devices it is usual for the two members to lie in adjacent planes with adjoining flat faces in close contact, and ordinarily it is not detrimental to so construct the cooperating members that overlapping portions of both members enter the same central opening of one of the open links to be connected, inasmuch as the ordinary open link has an opening of sufficient size to permit the relative tilting movements between the members necessary to effect the locking and unlocking operations.

With the now preferred narrow form of link, however, the central opening is so constricted that the combined thickness of two such members fills fairly well the rounded end portion of the link, even when the members lie closely in contact with each other.

The preferred means for locking the two members together includes a hook device at the free end of one of the pivotally connected members, this hook being so formed that, as the members are swung relatively to each other, the free end with its hook must be displaced from the general plane in which it swings, and this displacement so spreads apart the portions of the members adjacent to the pivot that there is not sufficient room within the central opening to permit the spreading action. This difficulty is aggravated and the spreading is resisted by the curved portions of the inner walls of the central opening of the link.

To avoid this difficulty, the present invention provides for such construction of the members adjacent to their pivotal connection that the link is only held against the tension exerted on it by its engagement with one of the pivotally connected members, the material of the other member being cut away so that, when the other member is rotated about its pivot, a notch or suitable opening is available in which the end of the link may rest, but without deriving support against the tension exerted upon the chain. Accordingly, only one of the members is positioned within the open link at any time, and a very narrow form of link can be used.

Another object of the invention is to provide improved means for effecting simply and readily a permanent connection between one end link of the chain and one of the pivotally connected members of the connecting device; this improvement comprises the provision of a tongue which can be readily bent over to close a slotted portion of the swinging lever to which the end of the chain is to be connected permanently.

A further object of the invention is to provide one of the members of the connecting device with an open hook adapted to enter an open link in one portion of a chain, and so situated that the other member closes this open hook when the members are in locked position, thus holding the link against accidental displacement.

Another object is to so form the members that, when they are assembled with the chain in place upon a tire, the normal tension of the chain acts to prevent the locking member from swinging into a position which might permit an accidental unlocking movement of one member relatively to the other, and still another object is to construct the co-operating parts in such a manner as to prevent accidental release of the chain link from the hook on the tension member when the chain is slack.

The above and other features of the invention are illustrated and described fully in the accompanying drawings and specification and are pointed out in the claims.

In the drawings—

Fig. 1 is a view in front elevation of a sufficient portion of a side chain adapted for use as part of the anti-skid device employed upon a vehicle wheel, to permit a ready understanding of the structure and mode of operation of the invention, which has been embodied therein, the parts being shown assembled and ready for closing;

Fig. 2 is a similar view showing the parts locked in closed position;

Fig. 3 is an edge view showing the members in the relative position illustrated in Fig. 1;

Fig. 4 is a similar edge view showing the members partly closed;

Fig. 5 is a similar edge view showing the members closed and locked in their operative position for use;

Fig. 6 is a detail view of the tension member, taken separately;

Fig. 7 is a detail view of the locking lever, taken separately.

In the now preferred form of connecting device selected for illustration and description to permit ready and complete understanding of the invention, the parts designated respectively by the reference characters 11 and 12 are two members adapted to be connected with each other pivotally for the purpose of forming a connecting and tightening device for any suitable form of chain, as for example one of the side chains of an anti-skid device for vehicle wheels of the type already mentioned briefly. The two ends of the side chain shown are designated by the reference characters 13 and 14, and the character 15 designates another link of the side chain, and either of the links 13 and 15, it will be understood without further explanation, may be hooked upon the hook 16 instead of the link 13, to shorten the side chain, and cross chains (not shown) may be connected to the side chain at suitable intervals, extending across the tread of the tire to a similar side chain which may be provided with a connecting device of the character under description.

The members 11 and 12 may be of any material and construction suitable to carry the invention into effect. The member 11 may be designated conveniently for the sake of brevity as the tension member of the connecting device, and the member 12 may be similarly designated briefly as the locking device.

So far as possible, each of the levers is preferably formed of flat metal lying in a single plane, and the tension member 11 is provided with the hook-shaped portion 16 already mentioned, in which is formed an open slot 17 adapted to receive the selected open link near the end of one portion of the chain, such as that shown at 13. The tension member is further characterized preferably by a slot or opening 18 formed near its other end from that of the hook 16, this slot preferably opening toward said other end of the member, and adjacent to the opening 18 there is a pivot 19, which preferably takes the form of a rivet or post transfixing the portion 20 of the tension member and also transfixing the portion 21 of the locking lever 12, thus connecting the two component members 11 and 12 pivotally.

The pivot post is preferably of sufficient length to receive a coil spring 22 which surrounds the end of the post extending beyond the locking lever 12, and this coil spring is confined between the surface 23 of the locking lever and the head 24 of the rivet. The spring 22 acts to force the two members together normally, but the length of the rivet is such that a tilting movement of the levers relatively to each other can be effected for a purpose to be described later.

The locking lever 12 is preferably so constructed as to adapt it for permanent connection with a selected link at the other end of the side chain, as, for example, the link 14, and this connection can be established in any suitable fashion, but by an important feature of the invention can be accomplished very readily by bending over the short tongue 25, best seen in Fig. 7, into the position shown in Fig. 1. After the tongue has been thus bent, the link is confined within the opening 26, and the connecting device, as a whole, may be thus permanently attached to the side chain.

After the side chain has been placed upon the vehicle wheel and the hook portion 16 has been assembled with the selected end link 13, the locking lever 12 is swung around the pivot 19 and, as it swings, it draws together the ends of the side chain, placing the whole side chain under tension, and at the same time carries the end 27 of the link 14 into the opening 18, which, as already described, affords clearance for the same but has no special function otherwise, except that its walls aid to prevent accidental displacement of the link 14 from the tongue 25. It will be seen that the tongue 25 does not sustain any great strain, inasmuch as the entire effect of tension is brought against the rounded edge of the opening 26 in the locking lever.

Upon reference to Figs. 3, 4 and 5, it will be obvious that a connecting device of this improved type can be used with extremely narrow links, inasmuch as only the thickness of the locking lever need be accommodated within the central opening 33 of the link at one end, and similarly only the thickness of the hook 16 need be accommodated at the other end of the chain.

The locking lever 12 is preferably provided further with a hook or locking portion 28, which serves, when the members are closed, to engage the forwardly curved surface 29 of the tension member, gripping the same like a finger so that it requires manual operation by the user to effect unlocking movement, and such unlocking movement must be accomplished by swinging the locking lever first slidingly forward, then tiltingly against the action of the spring 22 (see Fig. 4) and then backward, in the manner set forth in the aforesaid Patent 1,403,319, and which does not require further description, inasmuch as the type of two-part connecting device having such a spring-controlled tilting and swinging action between the levers is now well known. The closing action of the hook end of the locking lever is facilitated by bending a portion 30 of the edge 31 at the hook end of the tension member into a flaring shoulder which, as the hook swings around, acts like a cam to tilt the locking lever and permit the hook to swing over into its final locking position shown in Figs. 2 and 5.

In pursuance of the invention, a novel feature of considerable importance is the location of the locking hook 28 adjacent to the retaining hook 16 in the closed position of the connecting device (see Fig. 2) so that this retaining hook not only locks the locking lever against accidental swinging movement but also locks the chain link 13 in place by obstructing the opening 17 in the manner illustrated. Preferably the flaring edge 31 is so constructed that it serves as a guide for the thumb or finger of an operator, (see Fig. 2), exposing the edge 32 of the locking lever directly back of the locking hook 28 so that, when it is desired to initiate the unlocking movement of the locking lever, it is easy to push the latter outward, and then it can be swung back to uncover the opening 17 of the hook 16, so that the link 13 can be removed therefrom readily. It is to be noted that this releasing movement of the locking lever is prevented normally by the tension or pull of the chain end 14 against the part 26, which tends normally to hold the hook portion 28 in locking position, inasmuch as it tends to cause rotation of the locking lever around the pivot 19 into locking position.

The presence of the end 27 of the link 14 in the opening 18 prevents the locking lever from swinging outwardly to an extent sufficient to permit the hook 28 to clear the opening 17 and permit accidental displacement of the link 13 from hook 16 if the side chain is slack.

From the above description it will be understood that the connecting device is of an inexpensive structure, having a minimum of moving parts consistent with proper functioning in the desired manner and can be readily assembled with the chain and, when so assembled, is retained permanently in place, is easily coupled and uncoupled for installation or removal of the chain, and that it operates efficiently to lock the chain in place when closed.

I claim:

1. A connecting and tightening device for chain, said device being characterized by a tension member, and by a locking lever connected pivotally and tiltingly thereto near one end and provided with a hook adapted to engage said tension member when the parts are in locked position, said device having resilient means for normally maintaining said lever and said tension member in parallel planes, and said device being further characterized by having said members arranged in overlapping relation to each other at the region of said members adjacent to said pivotal connection, and one only of said members having a portion adapted to enter and be connected with a chain link having an opening of sufficient width to receive only one of said members and permit relative swinging and tilting movement between said locking lever and tension member to effect locking and unlocking of said members.

2. A connecting and tightening device for chain, said device being characterized by a tension member, and by a locking lever connected pivotally and tiltingly thereto near one end and provided with a hook adapted to engage said tension member when the parts are in locked position, said device having resilient means for normally maintaining said lever and said tension member in parallel planes, and said device being further characterized by having one only of said members provided with a portion arranged for connection, at an overlapping region of said members adjacent to said pivotal connection, with a chain link having an opening of sufficient width to receive said locking lever only, and adapted to permit relative swinging and tilting movement between said locking lever and tension member to effect locking and unlocking of said members.

3. A connecting and tightening device for chain, said device being characterized by a tension member, and by a locking lever connected pivotally and tiltingly thereto near one end and provided with a hook adapted to engage said tension member when the parts are in locked position, said device having resilient means for normally maintaining said lever and said tension member in parallel planes, and said device being further characterized by having said members arranged for connection, at an overlapping region of said members adjacent to said pivotal connection, with a chain link having an opening of sufficient width to receive said locking lever only, and said tension member having its edge, near said pivotal connection, formed to receive said link, without entering the latter, whereby said device is adapted to permit relative swinging and tilting movement between said locking lever and tension member to effect locking and unlocking of said members.

4. A device characterized as in claim 3, said locking lever having, adjacent to said pivotal connection, a recess adapted to receive the end of a link, and having a tongue adapted to be bent around said link-end to confine within said recess and thereby to effect permanent connection of said link and locking lever.

5. A device characterized as in claim 3, said locking lever having, adjacent to said pivotal connection, a recess adapted to receive the end of a link, and having a tongue adapted to be bent around said link-end to confine within said recess and thereby to effect permanent connection of said link and locking lever, said recessed portion of said lever being so positioned as to sustain the tension upon the device when the members are closed, and acting under such tension to maintain the hook end of said locking lever in locked relation with said tension member.

6. A connecting and tightening device for chain, said device being characterized by a tension member, and by a locking lever connected pivotally and tiltingly thereto near one end and provided with a hook adapted to engage said tension member when the parts are in locked position, said device having resilient means for normally maintaining said lever and said tension member in parallel planes, and said device being further characterized by having said tension member provided with an open hook adapted to receive the selected link of a chain portion, said open hook being so positioned that escape of said link therefrom is prevented by said locking lever when the parts are in locked position.

7. A connecting and tightening device for chain, said device being characterized by a tension member and by a locking lever connected pivotally and tiltingly thereto near one end, said device being further characterized by having said locking lever adapted to enter an open chain link and exert a tightening effect upon said chain by swinging said link around said pivotal connection toward the edge of said tension member and said locking lever having near its free end a hook adapted to swing tiltingly over, and embrace, the remote edge of said tension member, and said tension member having an open hook near its free end adapted to enter another chain link, said tension member hook being closed by said hook end of said locking lever when in locked position, and the range of swinging movement of said locking lever being so limited by the presence of the chain link beween said members at the region of said pivotal connection as to prevent release of said other link in the absence of a tilting movement of said locking lever.

In testimony whereof, I have signed this specification.

JOHN R. REYBURN.